(12) United States Patent
Allsup

(10) Patent No.: US 7,584,109 B1
(45) Date of Patent: Sep. 1, 2009

(54) LONG TERM DISABILITY OVERPAYMENT RECOVERY SERVICE WITH PROVISION OF MEDICAL SERVICES AND MEDICAL PRODUCTS

(75) Inventor: James F. Allsup, Belleville, IL (US)

(73) Assignee: Allsup, Inc., Belleville, IL (US)

( * ) Notice: Subject to any disclaimer, the term of this patent is extended or adjusted under 35 U.S.C. 154(b) by 1390 days.

(21) Appl. No.: 10/846,781

(22) Filed: May 14, 2004

Related U.S. Application Data

(63) Continuation-in-part of application No. 09/629,323, filed on Jul. 31, 2000, now Pat. No. 7,260,548.

(60) Provisional application No. 60/189,551, filed on Mar. 15, 2000.

(51) Int. Cl.
*G06Q 40/00* (2006.01)
(52) U.S. Cl. .................... 705/4; 705/30; 705/39; 705/40; 705/44
(58) Field of Classification Search ............ None
See application file for complete search history.

(56) References Cited

U.S. PATENT DOCUMENTS

| | | |
|---|---|---|
| 4,491,725 A | 1/1985 | Pritchard |
| 4,858,121 A | 8/1989 | Barber et al. |
| 5,301,105 A | 4/1994 | Cummings, Jr. |
| 5,727,249 A | 3/1998 | Pollin |
| 6,208,973 B1 | 3/2001 | Boyer et al. |
| 6,411,939 B1 * | 6/2002 | Parsons ................. 705/35 |
| 6,625,582 B2 * | 9/2003 | Richman et al. ............ 705/35 |

FOREIGN PATENT DOCUMENTS

GB        2370892 A   *   7/2002

OTHER PUBLICATIONS

Social Security Disability Consultants (SSDC), Oct. 29, 1993 pp. 1-5.*
Allsup Inc.'s Overpayment Recovery Service (Allsup), 1997-1998, 2 pages.*
"Older worker's progression from private disability benefits to social securit . . . ", Social Security Bulletin; 2000; 63, 4; p. 27-37.*
"Pocket Guide to Federal Help for Individuals with Disabilities", Clearinghouse on the Handicapped, U.S. Dept. of Ed., Sep. 1987, p. 2-34.*
Business Reply Mail Card—*First, the Bad New . . . Now the Good News* Date Unknown.

(Continued)

*Primary Examiner*—Alexander Kalinowski
*Assistant Examiner*—Gregory Johnson
(74) *Attorney, Agent, or Firm*—Polster Lieder Woodruff and Lucchessi LC

(57) ABSTRACT

A method of obtaining Social Security disability benefits for uninsured individuals and providing medical services and medical products during the pendency of a claim for the Social Security disability benefits. The method provides for filing a claim for Social Security disability insurance payments and securing needed medical services and products for the individual, without full payment, during the pendency of the claim. The individual establishes a direct deposit account for deposit of the Social Security disability insurance payment and authorizes an electronic removal of funds from the account upon deposit of retroactive or future Social Security disability insurance payments to pay for the medical services and medical products.

34 Claims, 8 Drawing Sheets

OTHER PUBLICATIONS

Business Reply Card—*Who Says Drop Outs* Date Unknown.
*The Third-Party Administrator's First Choice In Cost Containment* Date Unknown; 2 pages.
"Disabled? Can't Work? Can't Wait?" Date Unknown; 2 pages.
"PASS—A Complete Benefit, Financial and Medical Services Program for People with Disabilities"; Date Unknown; 10 pages.
*Don't take our word for it when we tell you we're the nation's best Social Security assistance company* 1992; 4 pages.
*The Social Security Disability Specialists* 1993; 2 pages.
Social Security Disability Consultants, Oct. 29, 1993, pp. 1-5.
*How To Get Your Social Security Disability Benefits Quickly & Easily* 1995-1996; 2 pages.
*Allsup Inc.'s Overpayment Recovery Service* 1995-1996; 2 pages.
*Allsup Inc.'s Prescription For Medicare Recovery* 1995-1996; 2 pages.
Printout from Allsup's website—*Allsup's Employer Services* 1996; 3 pages.
Anonymous, "Injured Workers Were Paid Too Much," Sarasota Herald Tribune, Sarasota, Florida, Mar. 28, 1997.
*Help In Applying for Social Security Disability Benefits Allsup Inc.* 1997; 7 pages.
*Allsup Inc.'s Overpayment Recovery Service* 1997-1998, 2 pages.
*Disability Coordination By Allsup Inc.* 1999—only 2 months use; 5 pages.
Runner, Diana, "Changes in unemployment insurance legislation during 1998," Monthly Labor Review, Jan. 1998, v112, n1, p. 59; Dialog accession No. 03897677, file No. 148; 11 pages.
King, Drew, "Know the Disability Management Benchmarks," National Underwriter Life & Health—Financial Services Edition, v. 103, n7, p. 16, Feb. 15, 1999; 2 pages.
Web archive printout: http://webarchive.org/web/19991128152241/http.allsupinc.com/index.html.
Web archive printout: http://webarchive.org/web/20000229231516/www.allsupinc.com/services/corpser.htm.
*Enter A New Dimension Of Social Security Savings* 2000; 7 pages.
*Enter Long-Term Disability Savings* 2000; 6 pages.
*Enter Workers' Compensation Savings* 2000; 6 pages.
*Enter Group Health Savings* 2000; 6 pages.
*Social Security Disability Assistance Program* 2000; 6 pages.
Printout from Allsup's website: *PASS™-Post-Award Service & Savings* 2000; 2 pages.
*Seamless Overpayment Recovery Service* 2000; 4 pages.
Printout from Allsup's website: *Social Security-Driven Savings* 2003; 3 pages.
Allsup Employee Newsletter Article: *Bank Transaction Builds Client Base* Sep. 1999; 2 pages.

* cited by examiner

```
┌─ SMARTWARE FOR WINDOWS (NEW VERSION)                              ─□□⊠
│ WINDOW 1 ════════════════════════════════════════════════ {{<─>}} ▲
│ ORSDATA5.VW                    ┌─────────────────────┐   07/26/2000
│ SCREEN 1                       │ SSR CASE ORS DATA FILE │ 02:42:20P
│                                └─────────────────────┘
│ CLIENT CO  :
│ SITE ID    :
│ EMPLOYER   :
│ SSN        :                     DECEASED/NO MAIL:
│ CLAIMANT   :
│ ADDRESS 1  :
│ ADDRESS 2  :
│ CITY/ST/ZIP:
│ CONSULTANT :
│ ASSISTANT  :
│ LEVEL/STS  :
│ CLAIM NBR. :
│ CLMT ELCTD :
│ AOD        :
│                          PgDn FOR CLIENT DATA                     ▼
│ ◁                                                                 ▷
├────────────────────────────────────────────────────────────────────
│ MENU: DATA FILE ORDER PRINT TOOLS WINDOW HELP REMEMBER QUIT
│ VIEW: ORSDATA5.VW WINDOW 1                              REC: 1 (1)
│ LOAD CREATE MODIFY SAVE UNLOAD ACTIVATE DISPLAY-ACTIVE IMPORT EXPORT PASSWORD
```

FIG. 4

```
┌─ SMARTWARE FOR WINDOWS (NEW VERSION)                              ─□□⊠
│ WINDOW 1 ════════════════════════════════════════════════ {{<─>}} ▲
│ ORSDATA5.VW                    ┌─────────────────────┐   07/26/2000
│ SCREEN 2                       │ SSR CASE ORS DATA FILE │ 02:42:20P
│                                └─────────────────────┘
│ INITIAL FORMS TO CLMT :        DID ALLSUP DO INITIAL APP:
│ INITIAL FORMS FU      :        INITIAL APP STATUS       :
│ INITIAL FORMS TO SSA  :        RECON FORMS FU           :
│
│ ORS STATUS              :
│ ORS COMMENT             :
│ NQ REASON               :                              ALTF5 ME
│ CURRENT ORS STAGE       :    ┌─────────┐  TYPE:    ASSIGNED 2:
│ ORS FU DATE             :    │         │  TYPE:    LEAD ASSNG:
│ LEAD ORS FU DATE        :    │ PENDING │  DIR PAY OPTION AVAIL: Y
│ INITIAL REFERRAL STATUS :    └─────────┘
│ SSA FORM 795            :
│                                  CLAIMANT INCENTIVE       :
│ CALL TRANSITIONED BY REP:
│ ORS GROUP               :    PgDn FOR TALK SHEET
│ ◁                                                                 ▷
├────────────────────────────────────────────────────────────────────
│ MENU: DATA FILE ORDER PRINT TOOLS WINDOW HELP REMEMBER QUIT
│ VIEW: ORSDATA5.VW WINDOW 1                              REC: 1 (1)
│ LOAD CREATE MODIFY SAVE UNLOAD ACTIVATE DISPLAY-ACTIVE IMPORT EXPORT PASSWORD
```

FIG. 5

```
☐ SMARTWARE FOR WINDOWS (NEW VERSION)                                    ☐☐☒
 WINDOW 1 ═══════════════════════════════════════════════════ {{<—>}}
 ORSDATA5.VW              ┌─────────────────────────┐        07/26/2000
 SCREEN 3                 │ SSR CASE ORS DATA FILE  │        02:42:20P
                          └─────────────────────────┘

CASE RECEIVED                  :           DIRECT PAY ONLY
 BANK FORMS TO CLAIMANT         :           ORS INIT LETTER:
 BANKS FORMS RECEIVED FROM CLAIMANT:        ORS AUTH RECVD :
 BANK ACCOUNT TRANSFER DATA     :
 ORS REPAYMENT METHOD/ACCT TYPE :           TIME :       0
 CASE RETURNED                  :

OP TO CLIENT                   :           TIME :       0
 OP FROM CLIENT                 :           TIME :       0
 OP RECEIVED                    :
 ORS CLOSED                     :

PgDn FOR BANK DATA

MENU: DATA FILE ORDER PRINT TOOLS WINDOW HELP REMEMBER QUIT
 VIEW: ORSDATA5.VW WINDOW 1                                    REC: 1 (1)
 LOAD CREATE MODIFY SAVE UNLOAD ACTIVATE DISPLAY-ACTIVE IMPORT EXPORT PASSWORD
```

FIG. 6

```
☐ SMARTWARE FOR WINDOWS (NEW VERSION)                                    ☐☐☒
 WINDOW 1 ═══════════════════════════════════════════════════ {{<—>}}
 ORSDATA5.VW              ┌─────────────────────────┐        07/26/2000
 SCREEN 4                 │ SSR CASE ORS DATA FILE  │        02:42:20P
                          └─────────────────────────┘
 ┌─ TALKSHEET ─────────────────────────────────────────────────────────┐
 │ DATE       │ COMMENT                                        │ EMP  │
 │ 07/18/2000 │                                                │      │
 │ 07/18/2000 │                                                │      │
 │ 03/24/2000 │                                                │      │
 │ 03/01/2000 │                                                │      │
 │ 03/01/2000 │                                                │      │
 │ 02/09/1999 │                                                │      │
 │ 12/10/1997 │                                                │      │
 │ 12/10/1997 │                                                │      │
 │ 04/10/1997 │                                                │      │
 └────────────┴────────────────────────────────────────────────┴──────┘

PgDn FOR FEE DATA

MENU: DATA FILE ORDER PRINT TOOLS WINDOW HELP REMEMBER QUIT
 VIEW: ORSDATA5.VW WINDOW 1                                    REC: 1 (1)
 LOAD CREATE MODIFY SAVE UNLOAD ACTIVATE DISPLAY-ACTIVE IMPORT EXPORT PASSWORD
```

FIG. 7

```
□ SMARTWARE FOR WINDOWS (NEW VERSION)                           □□☒
WINDOW 1 ══════════════════════════════════════════════ {{<—>}} ▲
ORSDATA5.VW            ┌─────────────────────────┐      07/26/2000
SCREEN 5               │ SSDR CASE ORS DATA FILE │      02:42:20P
                       └─────────────────────────┘

A. SSDI RETROACTIVE BENEFITS      :   0.00  ACTUAL PAYMENT TYPE :
  C. DEPENDENT RETROACTIVE BENEFITS :           AMTAUTHBYCLIENT    $0.00
  D. EXTRA SSDI MONTHLY PAYMENT     :
  E. TOTAL FUNDS AVAILABLE TO REPAY :   0.00
  F. GRS OVERPAYMENT AMT DUE CLIENT :
  G. CLAIMANT INCENTIVE PERCENTAGE  :           %
  H. CLAIMANT INCENTIVE AMOUNT      :
  I. NET OVERPAYMENT DUE TO CLIENT  :   0.00
  J. AMOUNT RECOVERED FROM CLAIMANT :   0.00
  K. ORS FEE BASIS                  :
  L. OVERPAYMENT RECOVERY FEE %     :
  M. ORS FEE                        :           Q. CLAIMS FEE
  N. PERCENTAGE OF OP RECOVERED (J/I):  0.0
  O. PERCENTAGE OF OP TO REPAY (J/E) :  0.0
  P. PERCENTAGE OF OP TO RETRO (J/1) :  0.0     PAGE DOWN FOR MORE DATA
◁                                                                    ▷
MENU:  DATA FILE ORDER PRINT TOOLS WINDOW HELP REMEMBER QUIT
VIEW:  ORSDATA5.VW WINDOW 1                                 REC: 1 (1)
LOAD CREATE MODIFY SAVE UNLOAD ACTIVATE DISPLAY-ACTIVE IMPORT EXPORT PASSWORD
```

FIG. 8

```
□ SMARTWARE FOR WINDOWS (NEW VERSION)                           □□☒
WINDOW 1 ══════════════════════════════════════════════ {{<—>}} ▲
ORSDATA5.VW            ┌──────────────────────┐         07/26/2000
SCREEN 6               │ ORS DATA PARTIAL PAY │         02:42:20P
                       └──────────────────────┘

┌─ PAYMENTS ──────────────────────┐
  │ PAYMENT AMT │ PAYMENT DA │ P │ B │
  │             │            │   │   │
  │             │            │   │   │
  │             │            │   │   │
  │             │            │   │   │
  └─────────────┴────────────┴───┴───┘

END OF DATA
◁                                                                    ▷
MENU:  DATA FILE ORDER PRINT TOOLS WINDOW HELP REMEMBER QUIT
VIEW:  ORSDATA5.VW WINDOW 1                                 REC: 1 (1)
LOAD CREATE MODIFY SAVE UNLOAD ACTIVATE DISPLAY-ACTIVE IMPORT EXPORT PASSWORD
```

FIG. 9

```
┌────────────────────────────────────────────────────────────────────┐
│ ☐ SMARTWARE FOR WINDOWS (NEW VERSION)                      ▭ ▫ ⊠  │
│ WINDOW 1 ═══════════════════════════════════════════════ {{<─→}} ▲│
│                          END OF DATA                               │
│                                                                    │
│   FEE RATE   : 1.0                                                 │
│   CLNT LORS  : Y                                                   │
│   ORS RATE   :                                                     │
│   ORS OART.  : Y                                                   │
│   RETRO                                                            │
│   SSI RETRO                                                        │
│   DEP RETRO                                                        │
│   LORS OP AMT      $0.00                                           │
│   AMOUNT      24.74                                                │
│   LORS FEE         $0.00                                           │
│   ORS QUARTER                                                      │
│   PERCENT OF STLMT                                                 │
│   ORS AMT DUE CLIENT      0.00                                     │
│                                                                    │
│                                                                  ▼ │
│ ◁                                                                ▷ │
│ MENU: DATA FILE ORDER PRINT TOOLS WINDOW HELP REMEMBER QUIT        │
│ VIEW: ORSDATA5.VW WINDOW 1                            REC: 1 (1)   │
│ LOAD CREATE MODIFY SAVE UNLOAD ACTIVATE DISPLAY-ACTIVE IMPORT EXPORT PASSWORD│
└────────────────────────────────────────────────────────────────────┘
```

FIG. 10

```
┌────────────────────────────────────────────────────────────────────┐
│                                                                    │
│          SSA QUERY SUMMARY | SUBMIT OVERPAYMENT CALC.      ⊠       │
│          ─────────────────                                         │
│                                                                    │
│     THIRTYIVE, CLAIMANT - 000-00-0035                              │
│     COMPANY: ALLDEMO INC.  POLICY: SAMPLEPOLICY#  ID: GROUP A      │
│     ─────────────────────────────────────────────────────────────  │
│                                                                    │
│     ☐ OVERPAYMENT CALCULATION FORM                                 │
│             PRIMARY OP AMOUNT: $[      ]                           │
│     OP CALCULATION PERIOD FROM: [      ]   THROUGH: [       ]      │
│                                               (MM/DD/YYYY-BOTH FIELDS)│
│     ─────────────────────────────────────────────────────────────  │
│                                                                    │
│           DEPENDENT OP AMOUNT: $[      ]                           │
│     OP CALCULATION PERIOD FROM: [      ]   THROUGH: [       ]      │
│                                               (MM/DD/YYYY-BOTH FIELDS)│
│                                                                    │
│                                      [SUBMIT INFORMATION] [RESET]  │
│                                                                    │
└────────────────────────────────────────────────────────────────────┘
```

FIG. 11

LONG TERM DISABILITY OVERPAYMENT RECOVERY SERVICE WITH PROVISION OF MEDICAL SERVICES AND MEDICAL PRODUCTS

REFERENCE TO RELATED APPLICATIONS

This application is a continuation-in-part of application Ser. No. 09/629,323, filed Jul. 31, 2000 now U.S. Pat. No. 7,260,548, which claimed priority to provisional patent application Ser. No. 60/189,551, filed Mar. 15, 2000.

BACKGROUND OF THE INVENTION

The invention relates generally to methods of securing disability insurance benefits and, more specifically, to novel methods, generally configured with computer and software technology, of securing Social Security disability insurance benefits and providing ancillary services, such as medical services or products, during the pendency of the claim for Social Security disability benefits and receiving payment for the ancillary services and products from an account, after the deposit of the retroactive Social Security disability insurance payment or future payments.

The inventor's core business consists of representing individual claimants before the Social Security Administration (SSA) for purposes of obtaining Social Security disability insurance benefits (SSDI). Traditionally, the inventor's primary customers (clients) are insurance carriers that write long-term disability (LTD) policies and self-insured employers who desire to reduce their long-term disability expense by obtaining SSDI for their policyholders or their individual employees. The inventor represents uninsured claimants, as well, in obtaining Social Security benefits.

In connection with the provision of services to his clients, the inventor has developed new business methods to provide such services utilizing sophisticated computer programs, databases and electronic fund retrieval methods.

On average, it takes SSA twelve to eighteen months to process a claim for SSDI. Once SSDI is awarded, generally there is a retroactive benefit representing disability payments that should have been paid by the SSA beginning with the sixth full month an individual is off work due to disability. LTD plans are designed to offset the LTD benefit upon the disabled individual's receipt of SSDI. In other words, once SSDI is obtained for a claimant, the LTD is reduced. However, full LTD benefits are paid until the SSDI is awarded. Generally, the disabled employee signs an agreement to repay any overpayment created by the award of retroactive SSDI. A portion of the retroactive SSDI, therefore, is due to the LTD plan as repayment of this overpayment.

For example, a disabled individual is receiving $1,400 per month in LTD. After 18 months, SSA awards disability benefits of $1,000 per month. SSA issues a retroactive check for 12 months of benefits (SSA does not pay during the 5-month waiting period) or $12,000. Based on the plan design the disabled employee's LTD benefit will be reduced by $900 per month, for a net LTD benefit of $500. Since the disabled individual was paid $1,400, he or she would owe the plan $900×12 months, or $10,800.

Additionally, the disabled individual receives a number of financial advantages upon receipt of SSDI:

Increased Monthly Income

Although the initial SSDI may be offset by other disability or retirement benefits the disabled individual already is receiving, the SSDI cost-of-living increases may not. Thus, the combined benefits may increase each year when SSDI cost-of-living increases are paid.

Increased Retirement and Survivors' Benefits

Social Security disability entitlement "freezes" the Social Security earnings record. Social Security regulations stipulate that any years "wholly or partially within a period of disability" will be excluded from the computation of future benefits. Thus, the amount of eventual Social Security retirement benefits, dependents' benefits, or even a subsequent disability or survivors' benefits, may be higher because these lost years of earnings will not be considered in future computations.

Medicare Coverage

After the individual has received SSDI for twenty-four months, regardless of age, he or she also becomes eligible for Medicare benefits. This includes Part A hospital benefits and Part B medical benefits.

Surviving on lower income with mortgages, car payments and other debts is frightening to disabled individuals. When they receive a large check for retroactive benefits, it is difficult to resist the temptation or necessity to use the money to improve their situation. LTD plans were experiencing difficulty collecting this overpayment. The plans were using a variety of collection scenarios:

1. Hope for a lump sum payment by the disabled individual;
2. Recover the overpayment from future benefits ($10,800÷$500=21.6 months); or
3. Refer the individual to a collection agency.

Scenario 1 generally yields a collection rate of 45% to 65% depending on the dollar value of the overpayment. Overpayments of under $10,000 were paid more readily than amounts over $10,000. Scenario 2 only worked if the individual remained on claim long enough to collect the total amount owed. Too often the individual went off claim due to age or death. Additionally, the LTD plan fiduciary lost the time value of money. Worst case is scenario 3, which yields only $0.50 to $0.60 on the dollar. Scenarios 2 and 3 did not promote a positive relationship with the disabled individual. Hence, the inventor recognized the need for assistance in, and a method for, the enhanced recovery of the overpayment.

Also, in the course of representing uninsured disabled individuals, the inventor recognized that a disabling event affects the disabled individual's life both physically and mentally and leaves him or her with the sense that his or her life is out of control. Although the individual may be entitled to SSDI, on average it takes twelve to eighteen months to process a SSDI claim. The likelihood of an uninsured, disabled individual being able to obtain credit or funds from other third-party sources is questionable. Without a sufficient alternative means of support, the individual is presented with immediate financial concerns. For example, the disabled individual may not have sufficient funds on hand to purchase necessities. Moreover, the disabled individual may need additional or ancillary services such as medical services or medical products as a result of the disabling event and, absent healthcare or disability insurance, have no means to procure the services or products.

The inventor has recognized the need to alleviate the financial concerns and physical needs of the disabled individual to the extent reasonably possible and to provide a means by which such individual may continue to meet his or her basic needs.

Based upon the foregoing, therefore, it would be advantageous to provide a method of obtaining SSDI, recovering any overpayments of LTD benefits and providing financial assistance and medical services or medical products for disabled individuals during the pendency of their claims.

SUMMARY OF THE INVENTION

The present invention provides a method, generally configured with computer and software technology, for obtaining Social Security disability insurance benefits (SSDI) from the Social Security Administration (SSA) for disabled individuals while providing ancillary medical services and products to the disabled individual during pendency of the claim with the SSA.

The system preferably provides for the pre-authorized automatic withdrawal of funds from the disabled individual's account after the receipt of retroactive SSDI benefits to pay for previously provided ancillary medical services and products. The instant invention provides a method of obtaining SSDI from the SSA and payment for services and products out of the account after deposit of the SSDI benefits that utilizes computer and electronic technology to automate the method. The method also preferably provides for financial assistance during the pendency of the disabled individual's claim for SSDI.

One aspect of the instant invention is a method of providing medical services and medical products to an uninsured, disabled individual through healthcare providers during the period that the disabled individual's application for SSDI is being processed. The claimant provides authorization to the Service Provider to withdraw payment prior to the direct deposit of the SSDI payment into the claimant's account. The payment for the services and products is automatically recovered out of the claimant's account after the deposit of the retroactive SSDI payment and/or future SSDI payments. A financial assistance arm of the novel method allows a Service Provider to arrange for funds to be provided to a claimant for expenses during pendency of their claim for SSDI.

The present invention provides a means for uninsured disabled individuals to meet certain basic needs by obtaining necessary medical services and products during a time they are most needed and the disabled individual is least likely to able to obtain the services without assistance.

BRIEF DESCRIPTION OF THE DRAWINGS

FIG. 4 is the overpayment recovery service input screen 1 that contains client company and claimant information;

FIG. 5 is the overpayment recovery service input screen 2 that contains information on the status of the overpayment recovery service;

FIG. 6 is the overpayment recovery service input screen 3 that contains overpayment information;

FIG. 7 is the overpayment recovery service input screen 4 that contains log notes;

FIG. 8 is the overpayment recovery service input screen 5 that contains payment information;

FIG. 9 is the overpayment recovery service input screen 6 that contains a table to record partial payments;

FIG. 10 is the overpayment recovery service final amount due client screen;

FIG. 11 is the screen summary, overpayment calculation and submission screen.

DESCRIPTION OF THE PREFERRED EMBODIMENT

Seamless Overpayment Recovery Service (Seamless ORS®)

Figure 1:
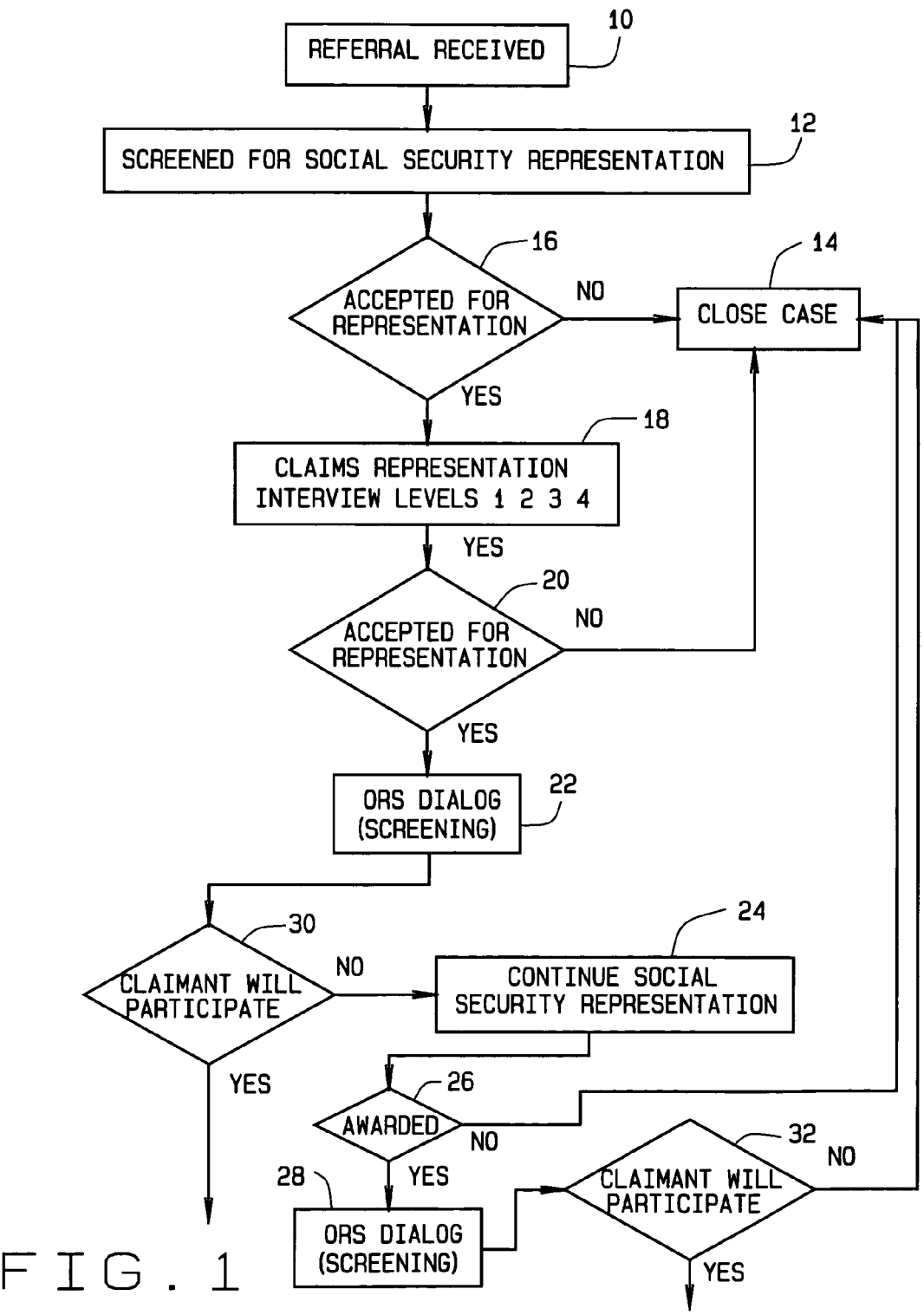
FIG. 1 is a block diagram illustrating the initial steps of the seamless overpayment recovery services method of the present invention.

The instant invention includes specific procedures, computer programs, databases and forms, that, when integrated, meet applicable regulatory provisions and are in compliance with Automated Clearing House Network, Regulation E (regarding electronic funds transfers) and the SSA's rules on the assignment of benefits, to permit immediate withdrawal of an overpaid amount of prior paid long-term disability insurance benefits. The overpaid amount is collected directly from a disabled individual's account after the SSDI payments have been received by the disabled individual from the SSA. The overpaid amount then is returned to the long-term disability insurance carrier or employer, less applicable fees in appropriate circumstances By implementing this novel process, the invention increases the success rate of overpaid benefit recovery and decreases the amount of time to effect such recovery.

The method is divided into four major steps, with several important sub-steps. The method of the present invention is best illustrated with reference to the block diagram, FIGS. 1 through 3.

The four major steps of the method include:

1. Initial Social Security Representation, which is designed to secure the award of SSDI from the SSA;

2. Verification Of SSDI Benefit Amount, which is designed to confirm with SSA the SSDI benefit and amount of retroactive payments;

3. Calculation Of The Overpayment Amount, which is designed to expeditiously determine the overpayment of LTD benefits upon receipt of an SSDI award; and 4. Recovery Of The Overpayment, which is designed to recover overpayments through direct withdrawal of funds from the individual's bank account, preferably by electronic "sweeping" of the overpaid amount from a deposit account.

Initial Social Security Representation

The inventor's Social Security Representation is designed to secure approval of SSDI from the SSA. The steps below, and as illustrated in the drawings, outline the representational process through award of the SSDI claim. For purposes of brevity and clarity, the provider of the novel services will be referred to hereinafter as "The Service Provider"; the client disability insurance carrier or self-insured employer will be referred to as "the client"; and the disabled individual seeking insurance payments is referred to as "the claimant".

Step 1—Identify SSDI-Eligible LTD Claimants

A.—The Service Provider Receives Referrals

As shown in FIG. 1, a LTD claims examiner, generally employed by the client insurance provider or self-insured employer, refers cases to The Service Provider for representation, as indicated by reference numeral 10. The claims examiner submits a completed Social Security Referral Checklist, shown below as Exhibit 1, which provides The Service Provider with an overview of the case and all supporting file documentation. The information from the Referral Checklist then is entered into The Service Provider's computerized databases for processing and screening 12. If the claimant is not accepted for representation, the case is closed 14. If the claimant is accepted for claims representation 16, i.e. is eligible for Social Security disability benefits, the process proceeds to the next major sub-step.

Exhibit 1.
SOCIAL SECURITY REFERRAL CHECKLIST

| | | | | |
|---|---|---|---|---|
| Referring Company: | _____ | | Client Co. #: | _____ |
| Street Address: | _____ | | | |
| City/State/Zip: | _____ | | | |
| Phone: | _____ | | Fax: | _____ |
| Disabled Claimant: | _____ | | Male: ☐ | Female: |
| Street Address: | _____ | | | |
| City/State/Zip: | _____ | | | |
| Phone: | _____ | | Date of Birth: | _____ |
| Social Security #: | _____ | | LTD Policy #: | _____ |
| Employer: | _____ | | Occupation: | _____ |
| Diagnosis: | _____ | | | |
| Date Last Worked: | _____ | | Last SSA Denial: | _____ |
| Insurance Contract Offset: | q Primary Only | q SSA Disability Only | q SSA Widow's Benefits | |
| | q Primary & Dependents | q SSA Disability & Retirement | q Reduced Retirement | |
| Diary File: | q 3 Months | q 6 Months | q 12 Months | |
| | | YES  NO | Current LTD Amount: | _____ |
| Is the claimant involved in vocational rehabilitation? | | q  q | | |
| Are there dependents in the household? | | q  q | | |
| Is the claimant receiving widow's benefits? | | q  q | | |
| Is the claim reinsured? | | q  q | If yes, by whom? | _____ |
| Comments: | _____ | | | |
| Referred by: | _____ | | Date: | _____ |

B.—The Service Provider Determines Claims Level

The Service Provider determines submission of the claim at one of four levels of the SSDI application process, as shown at 18 in FIG. 1. The four levels include an initial application and three sequential levels of appeals, as follows:

1. Initial Application to Disability Determination Service (DDS) of the SSA;
2. DDS Reconsideration of a previous decision;
3. Administrative law judge (ALJ) hearing and ruling on the claim; and
4. Appeals Council review.

If a claim is denied at any of the above listed levels, The Service Provider automatically submits the case to the next level of the process until the case receives a final approval or denial from the SSA, or the referring claims examiner requests that The Service Provider abandon pursuit of the claim.

Step 2—Obtain Claimant's Authorization

A.—The Service Provider Mails Solicitation Packets to Claimants

Once The Service Provider determines that the disabled individual qualifies for SSDI benefits 20, The Service Provider mails a packet of information to claimant explaining the benefits of obtaining SSDI and how it coordinates with LTD in their case through the novel seamless overpayment recovery service of the present invention.

The Service Provider details its services and requests the claimant authorize it to act as his or her representative before SSA. The Service Provider invites the claimant to call its toll-free number if the claimant has any questions. If The Service Provider has not received a response within seven days, it contacts the claimant to discuss its services.

B.—Claimant Submits Authorizations

The claimant signs and returns three authorization forms to The Service Provider in a postage-paid envelope. The first, SSA Form 1696, authorizes The Service Provider to represent the claimant in the SSDI application process. The second, a consent form, gives permission for SSA to release information to The Service Provider concerning work history, entitlement dates, and prior applications. The third form authorizes The Service Provider to release entitlement information obtained from SSA to the client.

Step 3—Applications and Appeals

A.—The Service Provider Interviews Claimant and Completes Forms on Computer Screens The Service Provider representative calls the claimant and secures relevant information to complete the initial application forms for SSDI and the obligation to repay any overpayment resulting from the retroactive award of SSDI.

At this point in the process, the representative completes the ORS Dialog (Screening) 22, FIG. 4, to gather the appropriate information to facilitate the recovery of the overpaid benefit. The claimant is interviewed and the information is entered into The Service Provider's databases through the use of the ORS client company and claimant personal information screen, FIG. 4. This screen contains information on the client company (pre-entered) and the claimant's personal information, (i.e. name, address, Social Security number, etc.). The computer program allows information screen in FIG. 4 also to pull claim status information from the ORS status screen, shown in FIG. 5 which details the status of the SSDI claim (i.e. awarded, closed, denied, pending, and the level of the claim). As seen in FIG. 1, if the claimant declines to participate in ORS, The Service Provider will continue to represent the claimant before the SSA 24 to obtain SSDI. Also as shown in FIG. 1, if the claim is awarded SSDI from the SSA 26, The Service Provider again can screen the claimant for participation in ORS 28. If the claimant again declines participation, the case is closed.

Figure 2:
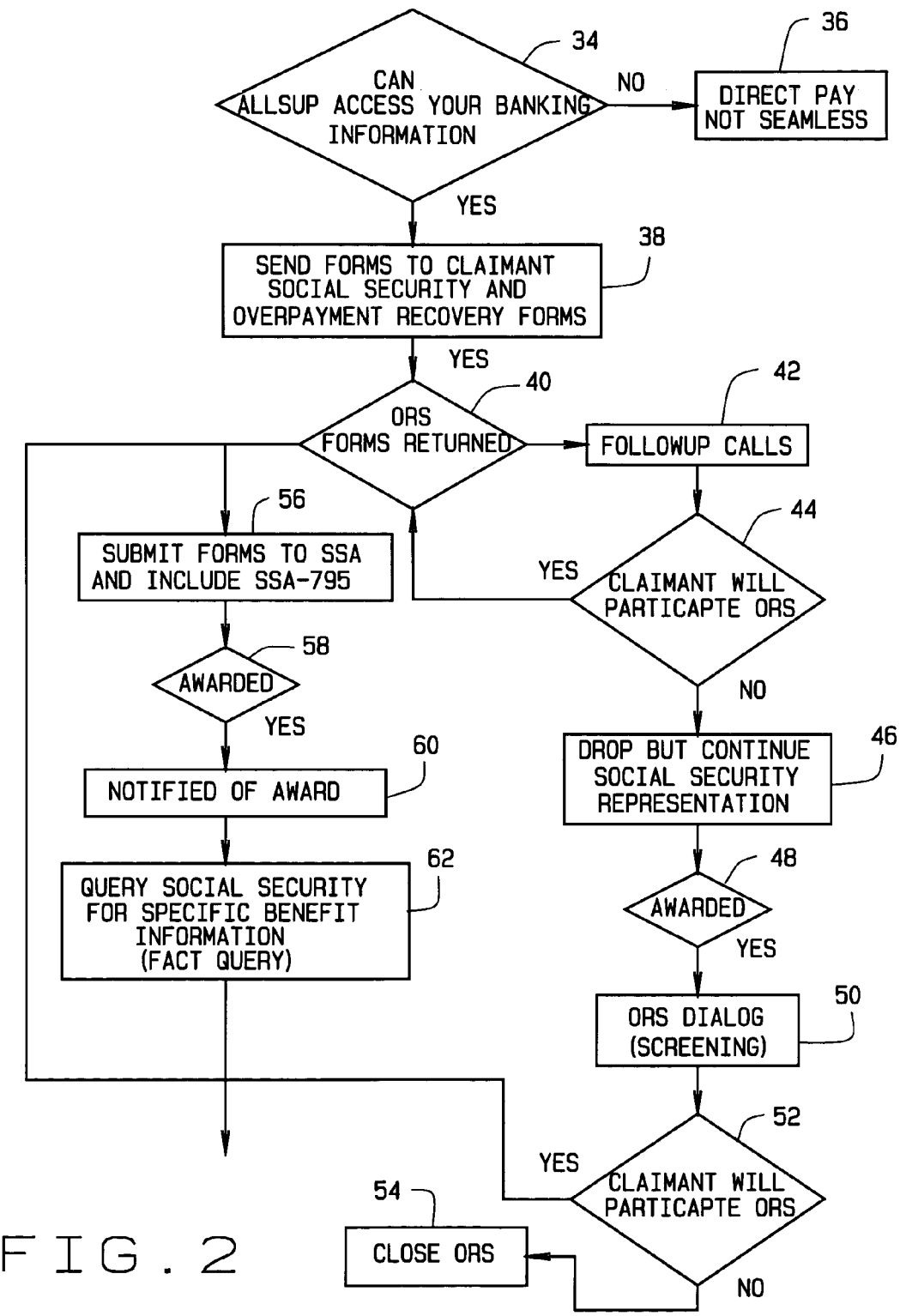
FIG. 2 is a block diagram illustrating additional steps of the novel seamless overpayment recovery services.

If the claimant consents to participation in the Social Security representation with the novel overpayment recovery service 30, either after the initial ORS screening or after the SSDI benefit is awarded 32, The Service Provider obtains written or oral permission, which is immediately reduced to writing or entered into a computer, from the claimant to access the claimant's banking information 34 in FIG. 2. For example, The Service Provider can obtain this authorization to access the claimant's banking information via computer, through a written form, or over the telephone. If the claimant declines, a direct manual payment of the overpaid amount may be made by the claimant to The Service Provider on behalf of the referring insurance company or self-insured employer 36.

If the claimant agrees to allow The Service Provider to access his or her banking information, The Service Provider sends to the claimant for signature the appropriately completed form SSA-795 to authorize the SSA to make a direct electronic payment of the SSDI to the claimant's account 38. The Service Provider also forwards for signature the appropriately completed forms that permit The Service Provider to electronically access the claimant's account to recover the overpaid benefit 38, i.e. a preauthorized withdrawal form.

B.—Claimant Returns Forms

The claimant reviews and signs the initial application and additional forms and returns them in a postage-paid envelope provided by The Service Provider 40. As shown in FIG. 2, if the claimant fails to return the signed authorization forms to The Service Provider, the representative initiates a follow-up 42. If the claimant still chooses to participate in ORS 44, the forms then are returned to The Service Provider 40.

If, at this point in the process, the claimant declines participation in ORS, the ORS service is discontinued but The Service Provider will continue to represent the claimant before the SSA to obtain the SSDI benefit 46. If the benefit is awarded, The Service Provider again will screen the claimant for participation in ORS. If the claimant again declines participation, the case is closed. If, after receiving the award, the claimant chooses to participate in ORS 48 the claimant again is screened for ORS participation 50. If the claimant agrees to participate at this juncture 52, the ORS forms are returned to The Service Provider, as shown at 40 in FIG. 2. If the claimant again declines to participate in the overpayment recovery service, the case is closed 54.

C.—The Service Provider Submits Application

When the claimant agrees to participate in the overpayment recovery service, at either juncture, The Service Provider representative processes the initial application forms for claims with any necessary documentation to the SSA 56. After SSA enters the claim into its system, it will forward the medical information to DDS.

D.—The Service Provider Accumulates Data and Tracks Progress

The Service Provider representative follows-up with SSA and DDS on a regular basis to track the progress of each application or appeal. The tracking of the progress of each application is accomplished through The Service Provider's centralized data processor driven by appropriate software. Examples of a computer generated data input and tracking screens employed in the novel process include the ORS status screen FIG. 5. The screen FIG. 5 contains information on the ORS status (pending, awarded, refunded, denied/not eligible, if not qualified, the reasons, and what stage of ORS the claim is in). The screen provides the identity of the ORS specialist assigned to the case, an ORS follow-up diary date, information from SSA Form 795, and initial referral status.

A log note screen which includes notes in reverse chronological order is illustrated in FIG. 7. The information provided in the log notes, FIG. 7, is entered by The Service Provider, generally by a claims specialist or an ORS specialist of The Service Provider.

Other aspects of monitoring and tracking are performed by monitoring data entered into the central process through a screen illustrated in FIG. 6. This screen is the overpayment recovery input screen that includes overpayment information. For example, the data includes the date the ORS case was received. It tracks when the bank forms were sent to the claimant and confirms when the signed bank forms were received back from the claimant and allows The Service Provider to track for follow-up. FIG. 6 also indicates when the transfer was made from the claimant's bank account and also indicates the type of ORS repayment to which the claimant has consented. The screen provides the date the payment was made to the client, when an adjustment in the overpayment was received from the client and the date the ORS file for the particular claimant was closed.

The screen indicated as FIG. 8 is the overpayment recovery system input screen which contains payment information such as the amount of retroactive benefit the claimant is entitled to, dependent benefits, extra SSDI monthly payments, gross overpayment amount due to the client, incentives, net overpayment due to the client, the amount recovered, and The Service Provider's fee.

The screen indicated as FIG. 9 provides a table to record partial SSDI payments, i.e. payment amount, payment dates and whether the payment was made for the claimant or a dependent. The screen indicated as FIG. 10 indicates the overpayment recovery system final amount due to the client.

It will be appreciated that the use of the input screen FIGS. 4-10 allow The Service Provider to accumulate sufficient data to operate the system and allows for complete tracking of the status of any pending claim. The software is configured to create and sustain relational data bases so that the information entered into the computer through any of the above described screens subsequently is moved to appear on another screen, if relevant to that screen. Therefore, each datum needs to be entered only once.

E.—SSA/DDS Approves or Rejects Claim

SSA either approves or denies the claim and notifies The Service Provider representative and the claimant.

F.—The Service Provider Notifies Referring Client and Claimant of Decision

The Service Provider representative notifies the client examiner and claimant of SSA's decision and either initiates Step 4, below—Approval Processing—or continues with the appeals process until final denial or approval is made.

Step 4—Approval Processing

A.—The Service Provider Notifies Client and Claimant of Approval

When the SSA approves a claim and the SSDI is awarded 58, The Service Provider calls, mails or faxes an award notification to the client examiner 60. The Service Provider also can notify the client through interactive, computerized client access available to subscribing clients.

B.—The Service Provider Requests Confirmation

The Service Provider requests specific information known as a Fact Query from SSA regarding the award of SSDI 62. This information includes: The PIA (Primary Insurance Amount); benefit increases and effective dates; retroactive amount; date of SSDI award; the debit run date or "DRD"; and date of onset established by SSA. This information is added to the appropriate computer database through screen FIG. 8. Appropriate information obtained through the Fact Query can be added to a Fact Query summary screen FIG. 11 for use by the client to calculate the overpayment amount, if the client subscribes to computerized, interactive client access.

Verification of SSDI Benefit Amount

The Service Provider's verification of SSDI benefit amount is designed to obtain information regarding the SSDI benefit paid and retroactive amounts. The verification includes two major steps.

Step 1—Claimant Approved for SSDI

A.—Representative Receives Notice

The representative handling the claimant's SSDI claim receives notice from SSA of a favorable decision.

B.—Representative Notifies Client and Claimant

Upon favorable decision 58, a notice is sent to the client and claimant. The notice informs of the award of SSDI and advises that the specific benefit amount will be forthcoming. The notice also reiterates the claimant's responsibility to repay the overpayment of LTD benefits.

Step 2—The Service Provider Verifies SSDI

A—The Service Provider Requests Information from SSA

The Service Provider requests specific information known as a Fact Query from SSA regarding the award of SSDI 62. This information includes: The PIA (Primary Insurance Amount); benefit increases and effective dates; retroactive amount; date of SSDI award; the debit run date or "DRD"; and date of onset established by SSA. This information is added to the appropriate computer database through screen FIG. 8.

B.—The Service Provider Receives Information from SSA

Figure 3:
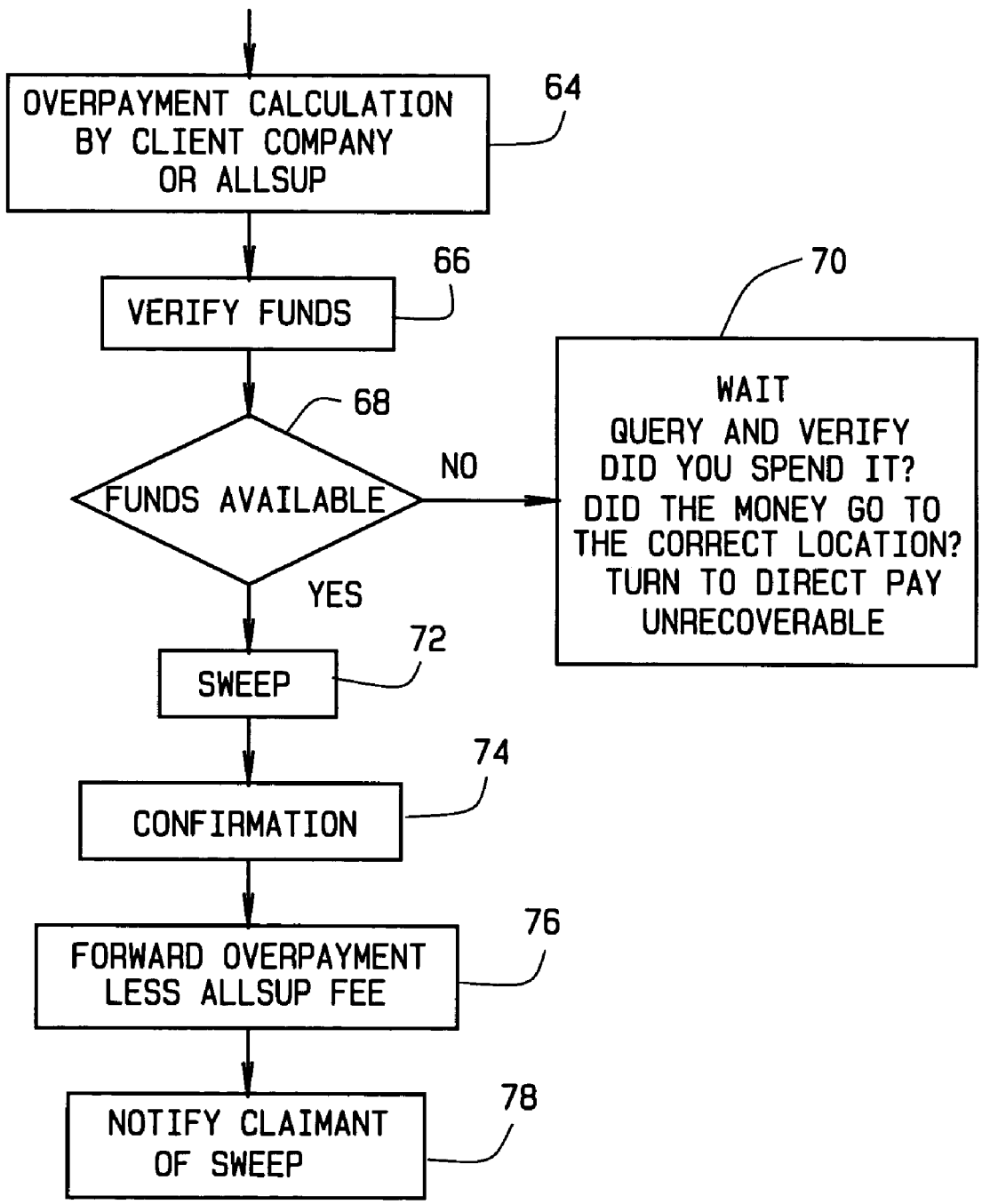
FIG. 3 is another block diagram illustrating additional steps of the novel seamless overpayment recovery services.

Upon receipt of information, The Service Provider obtains the amount of the overpayment, as shown at 64 in FIG. 3.

Calculation of the Overpayment Amount

Calculation of the overpayment amount requires two major steps.

Step 1—Representative Receives SSDI Award Information

The Service Provider representative receives detailed entitlement dates and SSDI benefit amounts from SSA.

Step 2—The Service Provider or Client Calculates the Overpayment

A. The Service Provider immediately calculates the overpayment upon receipt of SSDI award information and enters the data through screen FIG. 8. The Service Provider generally verifies its calculated amount with the client. See Example 1, following, for a representative example of an overpayment calculation; or B. The client calculates and submits the overpayment amount to The Service Provider by any acceptable means; or C. Clients subscribing to the interactive component of the present invention calculate the overpayment amount and submit the overpayment amount to The Service Provider through the Fact Query Summary and Submit Overpayment Calculation screen, FIG. 11.

EXAMPLE 1

REPRESENTATIVE OVERPAYMENT CALCULATION

SSDI Award Information

It is October 1999. The claimant has been awarded SSDI benefits effective October 1997. The following information is received from Social Security Administration:

| | |
|---|---|
| Wage Earner Retroactive Benefits payable through Oct. 3, 1999 | $17,462.00 |
| Net Monthly benefit Nov. 3, 1999 and continuing | $741.00 |
| Date of Entitlement to Medicare Part A | 10/01/99 |
| Date of Entitlement to Medicare Part B | 10/01/99 |
| Established Date of onset | 04/15/97 |
| Date of entitlement to cash benefits | 10/01/97 |

EXAMPLE 1-continued

REPRESENTATIVE OVERPAYMENT CALCULATION

| | |
|---|---|
| Scheduled medical reexam date | 10/01/02 |
| Date payment certified by Social Security | 09/28/99 |
| Monthly payment beginning Oct. 1, 1996 for Wage Earner | $700.00 |
| Monthly payment beginning Dec. 1, 1996 for Wage Earner | $721.00 |
| Monthly payment beginning Dec. 1, 1997 for Wage Earner | $741.00 |

Overpayment Calculation

| | | | |
|---|---|---|---|
| | Monthly LTD Benefit | | $1,500.00 |
| | Less SSDI Original Rate | | −$700.00 |
| | New LTD benefit to claimant | | $800.00 |
| Date | Original LTD | New LTD | Overpayment |
| Oct. 1, 1997 | $1,500.00 | $800.00 | $700.00 |
| Nov. 1, 1997 | 1,500.00 | 800.00 | 700.00 |
| Dec. 1, 1997 | 1,500.00 | 800.00 | 700.00 |
| Jan. 1, 1998 | 1,500.00 | 800.00 | 700.00 |
| Feb. 1, 1998 | 1,500.00 | 800.00 | 700.00 |
| Mar. 1, 1998 | 1,500.00 | 800.00 | 700.00 |
| Apr. 1, 1998 | 1,500.00 | 800.00 | 700.00 |
| May 1, 1998 | 1,500.00 | 800.00 | 700.00 |
| Jun. 1, 1998 | 1,500.00 | 800.00 | 700.00 |
| Jul. 1, 1998 | 1,500.00 | 800.00 | 700.00 |
| Aug. 1, 1998 | 1,500.00 | 800.00 | 700.00 |
| Sep. 1, 1998 | 1,500.00 | 800.00 | 700.00 |
| Oct. 1, 1998 | 1,500.00 | 800.00 | 700.00 |
| Nov. 1, 1998 | 1,500.00 | 800.00 | 700.00 |
| Dec. 1, 1998 | 1,500.00 | 800.00 | 700.00 |
| Jan. 1, 1999 | 1,500.00 | 800.00 | 700.00 |
| Feb. 1, 1999 | 1,500.00 | 800.00 | 700.00 |
| Mar. 1, 1999 | 1,500.00 | 800.00 | 700.00 |
| Apr. 1, 1999 | 1,500.00 | 800.00 | 700.00 |
| May 1, 1999 | 1,500.00 | 800.00 | 700.00 |
| Jun. 1, 1999 | 1,500.00 | 800.00 | 700.00 |
| Jul. 1, 1999 | 1,500.00 | 800.00 | 700.00 |
| Aug. 1, 1999 | 1,500.00 | 800.00 | 700.00 |
| Sep. 9, 1999 | 1,500.00 | 800.00 | 700.00 |
| Totals | $36,000.00 | $19,200.00 | $16,800.00 |

The Service Provider Fee Calculation

| | |
|---|---|
| Claims Fee: | |
| Flat Fee | $XXXX.XX |
| Overpayment Recovery Fee: | |
| X % of the Calculated Disability/LTD Overpayment | $XXXX.XX |
| Total Fees Due: | $XXXX.XX |

Amount To Client

| | |
|---|---|
| Amount received from claimant | $16.800.00 |
| Less The Service Provider fees | −$XXXX |
| Net amount to Client Company | $XXXX.XX |

Recovery of the Overpayment

Upon the calculation of the overpayment amount, the method provides the following major steps for recovering the overpayment amount from the disabled individual's account. It will be appreciated that the software is configured to perform the foregoing calculation upon entry of the appropriate data and the calculated overpayment amount will be viewable through an appropriate screen, as described above.

Step 1—Direct Electronic Withdrawal of Funds

A.—Verification of Funds

As shown at 66 in FIG. 3, the representative contacts the claimant's bank or the claimant to verify that there are sufficient funds to cover the pre-authorized withdrawal. As stated above, in a preferred embodiment, the Service Provider already has obtained appropriate documentation to allow it to directly access the claimant's bank account and recover funds through a withdrawal authorization form.

In alternative embodiments of the invention, the claimant may authorize withdrawal of the funds at another juncture of the process, for example, after funds have been deposited. In any event, the claimant authorizes the withdrawal at some point prior to the actual withdrawal by The Service Provider.

If the funds are available 68, The Service Provider can proceed with recovery of the overpaid amounts 68. Generally, The Service Provider anticipates the date of deposit through the Fact Query, Debit Run Date (DRD).

If there are not sufficient funds, The Service Provider can wait for the direct deposit from the SSA 70. Further, The Service Provider can follow up to determine if the funds went to the correct account. Also, The Service Provider can inquire if the claimant had received, but withdrew and spent the money paid by SSA 70. In the event of the latter, The Service Provider can seek a direct payment of the overpaid amount from the claimant or close the case as unrecoverable 70.

B.—Accounting Initiates Withdrawal of Funds

The Service Provider's accounting department initiates the process to withdraw or sweep the funds from the claimant's bank account by virtue of the pre-authorization form 72. If the account has insufficient funds to repay the overpayment, the accounting department will notify the representative.

C.—Representative Contacts Client Company

If the claimant does not have sufficient funds to cover the overpayment, the representative will contact the client company and discuss how it wants to proceed.

D.—Representative Notifies the Claimant

Ten days after the withdrawal, the representative sends the claimant a confirmation letter with full disclosure of the overpayment and the withdrawal amount 74.

Step 2—The Service Provider Issues LTD Overpayment to the Client

A.—The Service Provider Issues Check to Client Company

The Service Provider subtracts its fee for services performed. It issues a check to the client company 76 along with copies of the ORS Statement and confirmation of withdrawal or copy of the check received from the claimant 78; or B.—The Service Provider subtracts its fees for services and electronically transfers overpaid amounts to the client.

Step 3—The Service Provider Furnishes Management Reports

A.—The Service Provider Furnishes Management Reports

The Service Provider furnishes monthly management reports to the client company, which easily can be generated by gathering data represented by the foregoing screens, FIGS. 4-10. The reports are a consolidated listing of all claimants referred for overpayment recovery services and itemize the status of each claimant in the ORS process.

The development of processes and procedures to utilize the pre-authorized withdrawal form and the recovery of overpaid amounts and fees from claimants by electronic funds transfers, is a new concept in a specialized industry. As previously indicated, the invention allows The Service Provider to significantly increase the percentage of claimants from whom the overpayment is recovered and significantly increase the aggregate dollar amount recovered, as well as reduce the amount of time involved to effect such recovery. The process of the present invention imparts other benefits including, but not limited to:

The Service Provider Fees—Social Security Representational Service for Individuals.

Only 32% of the working population is covered by an LTD plan. The Service Provider offers Social Security Representational services for those disabled individuals that are not insured by an LTD plan. Direct payment or escrow accounts were the only methods previously available to obtain its fees. The novel process allows The Service Provider to use a pre-authorization for withdrawal of its fees from the individual's bank account.

The Service Provider Financial Assistance Program for Claimants.

Under this novel aspect of the invention, as will be described below, in certain disability claims, The Service Provider would extend funds to a claimant during the period such claimant's application for SSDI is being processed. Upon award of SSDI, The Service Provider will electronically withdraw the advanced amount plus interest, if applicable, based on the pre-authorization form signed by the individual.

Financial Assistance Program for Claimants (FAP)

The present invention contemplates a novel program of extending funds to uninsured disabled individuals (claimants) during the period such claimants' applications for SSDI and other benefits are being processed. The extension of funds to the disabled individual may be provided by The Service Provider or a subsidiary or by a financial institution through an arrangement established by The Service Provider with such financial institution.

The extension of funds also can include the advancement of health insurance premiums. For example, if the claimant qualifies for health insurance under COBRA, The Service Provider can advance funds so that the claimant can pay premiums. On the other hand, The Service Provider could pay the premiums on behalf of the claimant. When The Service Provider pays the health insurance premium so that the claimant can obtain ancillary medical services, which include services and products, the advancement of the premium also can be considered a component of the inventor's novel process for the provision of medical services and products, as described in detail, below.

On a monthly basis, those claimants who qualify for the Financial Assistance Program (FAP) will have credited to their checking or savings account or, in the alternative, by way of an increase in the amount of funds available under the individual's FAP account, a set amount of funds. The monthly amount to be credited to the individual will be determined at the time the individual qualifies for and enrolls in the FAP. The individual can use the funds for any purpose. Depending on the means to be utilized to implement the FAP, interest may be charged on those amounts provided to the disabled individual.

To the extent interest is charged on such funds, The Service Provider will structure the interest rate to be at a legally permissible rate below the standard rate a theoretical third-party lender would otherwise charge in a particular market under similar circumstances. To the extent required, The Service Provider or the financial institution will comply with all applicable laws, rules and regulations regarding licensing, disclosures and similar matters. In general, the claimant will not be required to return the amount of funds provided if a retroactive award of Social Security benefits is not obtained through The Service Provider. However, if a retroactive award is obtained, the claimant is required to refund the amount of funds made available to the claimant during the application process, together with any interest thereon, if applicable. The repayment of the amount of funds advanced during the application process and to pay any other fees, is deducted by The Service Provider following the retroactive award utilizing the pre-authorized withdrawal element of The Service Provider's novel overpayment recovery service, described above.

The Financial Assistance Program available for disabled individuals provides a temporary means for the disabled individual to meet basic needs and assists in alleviating financial pressures on the individual during a time when he or she is physically and mentally challenged and his or her income is reduced. FAP provides a novel and valuable service to disabled individuals, consistent with the maintenance of human dignity and The Service Provider's role as a responsive and productive corporate citizen.

Provision of Medical Services and Products

In addition to providing services to clients, such as LTD insurance carriers or self-insured employers The Service Provider also can represent uninsured, disabled individuals in their pursuit of SSDI before the SSA. As stated above, on average, it takes twelve to eighteen months to process a claim for SSDI. And also as explained above, there is generally a retroactive payment representing SSDI payments that should have been paid by SSA beginning with the sixth full month the disabled individual, also referred to as the claimant, was no longer employed due to his or her disability, i.e. the retroactive payment. SSA usually pays the retroactive payment in a lump sum following the award of SSDI, with ongoing monthly payments of SSDI continuing thereafter. Consequently, the successful claimant receives from SSA a retroactive payment and future payments.

Uninsured, disabled individuals can be negatively affected financially by their inability to work, particularly before the receipt of SSDI payments. Often during the period of unemployment and before the payment of SSDI benefits, the claimant is not able to obtain ancillary services from third-party providers, such as providers of physical or occupational therapy, durable medical equipment, prescription drugs or similar items.

Moreover, because of their precarious financial situation, these disabled individuals are not likely to able to purchase needed products or services on credit. The failure to obtain needed services and products can further exacerbate the individual's disabling condition. In many cases, providers of healthcare products and services recognize that these individuals need medical products or services, but these providers, heretofore, had no way of advancing products or services with reasonable confidence of being paid.

One aspect of the instant invention, broadly stated, is a method of providing necessary ancillary services to the uninsured, disabled individual through healthcare providers during the period that the disabled individual's application for SSDI is being processed. Associated healthcare providers advance ancillary services such as medical services or medical products without full payment for the services or products. As with the overpayment recovery service described above, in a preferred embodiment the claimant authorizes withdrawal of funds from a deposit account prior to the direct deposit of the SSDI payment into the claimant's account. Alternatively, the claimant may provide authorization to withdraw funds after the funds are deposited.

In any event, after the SSDI payment is directly deposited in the claimant's account, the payment for the services and products is automatically recovered out of claimant funds in the deposit account. This withdrawal is made from the claimant's account immediately after the deposit of the retroactive, lump sum SSDI payment and/or immediately after deposits of future SSDI payments.

It will be appreciated that when reference is made to providing ancillary services to the claimant, this procedure is intended to include selling or renting products, when products are provided.

Figure 12:
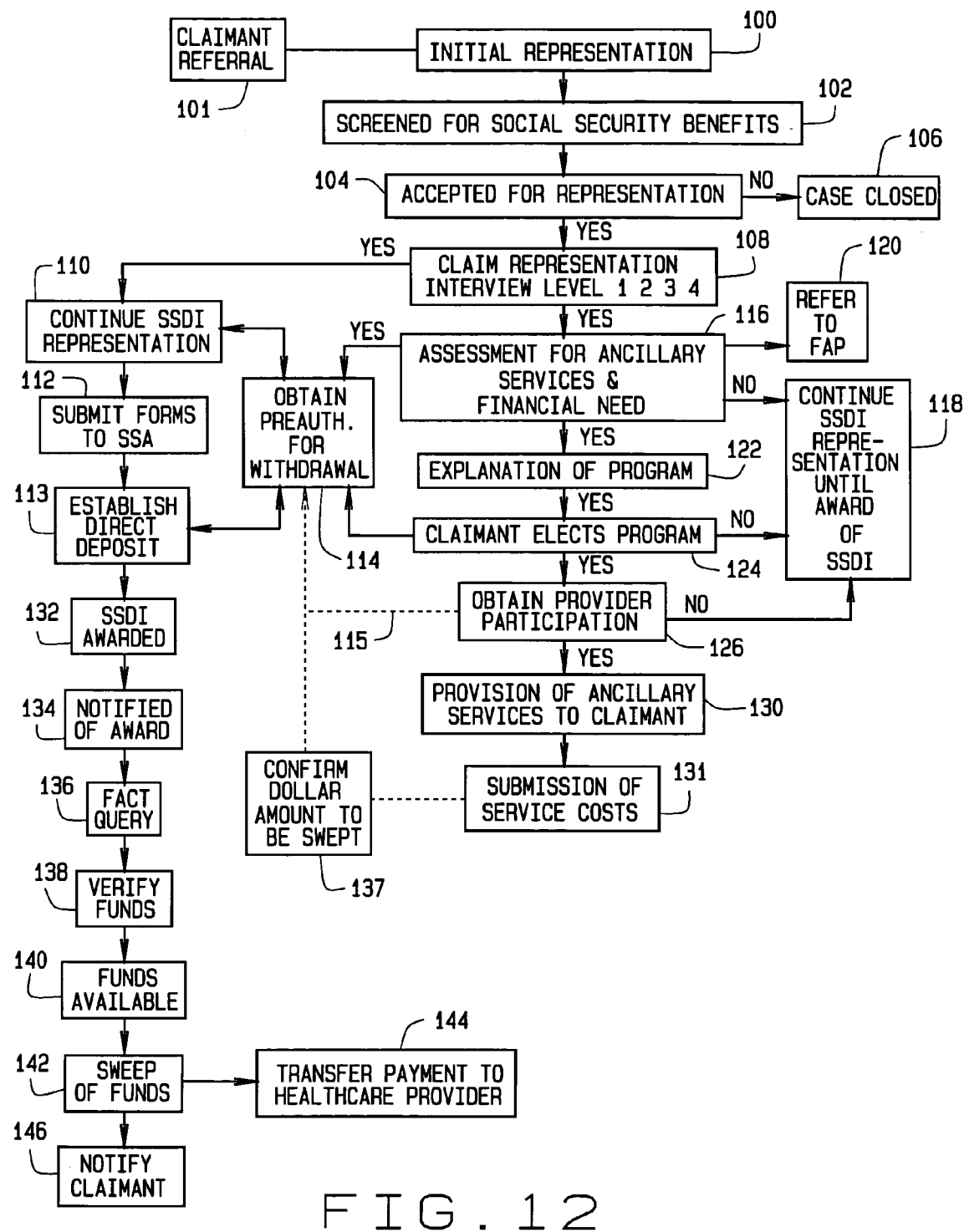
FIG. 12 is a block diagram of the method of providing ancillary medical services and products.

FIG. 12 illustrates the principal steps in the method of obtaining SSDI benefits and obtaining, and paying for, ancillary services including medical services and products, during the pendency of the claim for SSDI. It will be appreciated, that some of the details of the initial steps are the same as, or similar to, the initial steps taken by The Service Provider in recovering an overpayment, as set out above. Consequently, the following description, as well as FIG. 12, incorporate by reference those necessary details.

As shown at numeral 100, the claimant retains The Service Provider to provide initial Social Security representation for the claimant. For the purposes of the instant method, generally, the claimant is a disabled individual who does not have LTD insurance, is not employed by a self-insured employer, and does not have supplemental health insurance to pay for medical services or products. In one preferred aspect of the invention, the claimant initially is referred to The Service Provider by a healthcare provider who is aware of the claimant's needs. However, the claimant may come to The Service Provider without referral or by other referral means. The Service Provider screens the claimant to determine if the claimant is eligible for SSDI benefits 102. The Service Provider analyzes the claimant's case, obtaining information similar to that provided on the Social Security Referral Checklist, shown above. The information then is entered into The Service Provider's computerized databases for processing and screening 102.

If it is determined that the claimant likely will qualify for SSDI benefits, including a retroactive payment and/or ongoing or future SSDI benefits, The Service Provider accepts the claimant for representation 104, and the process proceeds to the next major steps. If the claimant is not accepted for representation, the case is closed 106. As explained in detail above, with reference to reference numeral 18 in FIG. 1, The Service Provider determines submission of the claim at one of four levels of the SSDI application process 108. Again, as set out in detail above, The Service Provider provides information on SSDI representation and claim forms to the claimant for review and completion. The claimant provides the necessary information and returns completed forms to The Service Provider.

It will be noted that, in general, at this juncture, The Service Provider continues the process of SSDI representation 110 directed to obtaining SSDI benefits for the claimant in a manner described above, with reference to the overpayment recovery service. That is, in general, The Service Provider enters all relevant information into its computer databases and generates and submits the appropriate claim forms to the SSA 112. At or about the same time, the Service Provider obtains authorization from the claimant to establish a direct deposit of the SSDI to the claimant's deposit account, for example by filing the completed SSA-795 113 and obtains preauthorization to electronically withdraw appropriate funds from that deposit account upon direct deposit of the SSDI by the SSA 114, the details of which also are described above. If the claimant does not have an existing deposit account, The Service Provider may assist the claimant in establishing a deposit account.

At or near this juncture in the process, once The Service Provider determines that the claimant is a viable applicant for SSDI benefits, and likely to qualify for retroactive and future SSDI payments, The Service Provider also determines if the claimant has need for, or qualifies for, any ancillary services such as medical products or medical services 116. Alternatively, The Service Provider may already have been informed of the claimant's needs for such ancillary services. The determination that the claimant qualifies for ancillary services may be based upon objective criteria, such as meeting qualifying medical criteria or other criteria.

It will be understood by those skilled in the art, that examples of such medical services can include, but are not limited to, such professional services as physician services, physical therapy, rehabilitation services, return to work services, occupational therapy, dietetic counseling, speech or audiology, home nursing, payment of health insurance premiums, for example, under COBRA, home intravenous therapy, dental care, or any other healthcare related services. With regard to medical products, examples may include, but are not limited to, durable medical equipment such as walkers, canes, feeding pumps, wheelchairs, cushions, hospital beds, lift chairs, lift equipment, eye glasses, hearing aids, prosthetic limbs or devices and so forth, as well as prescription or non-prescription drugs, intravenous fluids, oral nutritional supplement or tube feeding products, bandages, pads and so forth.

Thus, when the broader term "ancillary services" is used herein it is intended to include medical services and medical products, the term "medical services" is intended to include any medical services, whether specifically listed herein, whether known or unknown, foreseeable or unforeseeable at the time of the invention or application for patent. Likewise, the term "medical products" is intended to include any medical products, whether specifically listed herein, whether known or unknown, foreseeable or unforeseeable, at the time of the invention or application for patent.

Generally, the claimant who reaches this point in the process requires medical services or medical products but, because of the effect of the disability on the claimant's ability to work and financial position, the claimant does not have the financial resources to obtain the services or products. As stated above, the claimant's inability to procure the needed services or products can greatly exacerbate the claimant's condition. Consequently, at this juncture, The Service Provider also evaluates the claimant's financial status or needs 116.

If it is determined that the claimant does not require any ancillary services or if it is determined that the claimant has the financial resources to procure his or her own ancillary services and does not need to participate in the program, this part of the process stops and The Service Provider simply continues its SSDI representation. 118.

If however, The Service Provider determines that the claimant requires medical services or medical products, and requires financial assistance in obtaining the services or products, The Service Provider continues with the SSDI representation, refers the claimant to the Financial Assistance Program 120, described in detail above, if the claimant meets the objective criteria for financial assistance, and continues with the process of the present invention or both.

If The Service Provider determines, or has been informed, that the claimant requires such medical services or medical products that the claimant cannot presently pay for and, for example, meets objective criteria such as eligibility for SSDI, The Service Provider or a referring healthcare provider provides the claimant with details of the instant invention, fully disclosing the claimant's rights and liabilities 122. Basically, the claimant is informed that The Service Provider can help obtain the needed medical services or medical products for the claimant but the claimant will be required to pay for these ancillary services, as well as any Service Provider fees, interest or other expenses, out of the claimant's resources immediately following SSDI payments awarded to the claimant. At this point the claimant can agree to participate in the program 124. If not, the novel program is terminated and The Service Provider simply continues to represent the claimant for SSDI 118.

During the process, The Service Provider maintains contact with a healthcare provider to enlist the healthcare provider's participation in the program 126. The healthcare provider may be the same healthcare provider who made an initial referral or another participating healthcare provider. In any event, generally speaking, the term "healthcare provider" is intended to include any provider of medical services or medical products, such as those described above. The Service Provider generally has a relationship with a number of healthcare providers who have agreed to participate in the instant procedure, usually on a case-by-case basis.

The Service Provider provides the healthcare provider with an assessment of the likelihood of an award of SSDI from the SSA and with other relevant information needed by the healthcare provider to make a decision about continued participation. At that time, the healthcare provider elects to continue to participate or not. If no appropriate healthcare provider elects to participate, The Service Provider continues SSDI representation of the claimant 118 until an award. If the healthcare provider elects participation in the program for a claimant, the healthcare provider provides or advances the appropriate medical services or medical products to the claimant 130. When the transaction involves products, the healthcare provider either sells the product or rents the product to the claimant. The claimant may make a partial payment or down payment on the services or products. In any event, the healthcare provider provides the medical services or medical products without receiving full payment. In a preferred aspect of the invention, during the course of cooperation between the healthcare provider and the service provider, and generally immediately prior to the advancement or provision of the appropriate medical services or products to the claimant, the healthcare provider submits to The Service Provider information regarding the costs of providing the ancillary services that it is owed or will be owed, including any applicable fees, interest or so forth 115. The Service Provider then uses this information as the basis for a preauthorization to withdraw a predetermined amount of money from the claimant's account after an award of SSDI benefits. Again, if not done so previously, The Service Provider secures the direct deposit account and/or obtains preauthorization from the claimant for electronic withdrawal of monies from the claimant's direct deposit account.

It will be appreciated that, concurrently, The Service Provider is representing the claimant in an effort to obtain an award of SSDI 110 and submits the appropriate documentation or forms to the SSA 112. When the SSA approves the claim and SSDI is awarded 132, and The Service Provider is notified of the award 134, The Service Provider requests specific information from the SSA through an inquiry, described above as the Fact Query 136. The relevant information obtained through the Fact Query includes the Primary Insurance Amount (PIA); benefit increases and effective dates; the date of the award; retroactive amount; the future award amounts; the anticipated date of the deposit of the retroactive amount, i.e. the debit run date or "DRD", and the date of onset.

At or around this time, The Service Provider verifies with the healthcare provider the amount of monies that need to be withdrawn to reimburse the healthcare provider 137.

As shown at 138, at or about the time of the DRD, The Service Provider contacts the claimant's bank to verify that there are sufficient funds available to cover the amount of payment owed to the healthcare provider. The Service Provider already has obtained appropriate documentation to allow it to directly access the claimant's bank account and recover funds through a withdrawal authorization form, i.e. step 114.

If such funds are available 140, The Service Provider can proceed with electronic recovery or sweep of the predetermined amount, generally as designated on the preauthorization withdrawal form approved by the claimant, plus any service fees charged by The Service Provider, from the claimant's deposit account 142. Because The Service Provider obtained the relevant information, particularly the DRD through the Fact Query, The Service Provider can sweep the funds from the account before the claimant otherwise disposes of the money, thereby assuring payment to the healthcare provider. The Service Provider then transfers or forwards the invoiced amount to the healthcare provider 144. The transfer of funds at this step can be done manually, i.e. The Service Provider cuts a check to the healthcare provider, or by electronic transfer. At or about this time The Service Provider also notifies the claimant of the sweep 146.

In the event there are not enough funds in the deposit account to completely reimburse the healthcare provider, and the claimant qualifies for ongoing SSDI payments, funds can be swept on a monthly basis. Moreover, if the healthcare provider is renting medical products, such as durable medical equipment, The Service Provider then can sweep the monthly rental fee after deposit of the SSDI benefit in the deposit account, and forward the rental fee to the healthcare provider.

In another aspect of the invention, The Service Provider determines that the claimant qualifies for health insurance that will pay for the provision of any ancillary services required by the claimant, but the claimant presently is not receiving the health insurance benefit. For example, the claimant may qualify for extended health insurance benefits under COBRA, but presently does not have the funds to make the premium payments. Under those circumstances, The Service Provider may chose to pay the premiums for COBRA coverage on behalf of the claimant. Under this aspect of the invention, paying such premiums also can be considered as providing another ancillary medical service. Once the insurance coverage begins, the claimant can procure covered ancillary services from a healthcare provider.

At some point before or during the process of securing COBRA benefits for the claimant, the Service Provider begins the process of obtaining SSDI for the qualified claimant, as set out in detail above. Once there is an award and a deposit of SSDI benefit into the claimant's deposit account, The Service Provider then can recover the money it paid towards COBRA premiums on behalf of the claimant.

It will be appreciated that if there is not enough money in the claimant's account to cover the ancillary services and associated fees, or if there is to be a provision of services over time, the pre-authorization for automatic withdrawal includes authorization for automatic withdrawal of predetermined amounts on a periodic basis, for example, immediately following the deposit of monthly SSDI benefits in the deposit account. In any event, The Service Provider may choose not withdraw all funds from an account and may cap the withdrawal at an agreed upon level, for example, 75% of the amount in the account, so as to leave a balance of funds for use and disposition by the claimant.

It will be appreciated that steps in the foregoing method can be performed manually or electronically or computer assisted and that all methods for carrying out the described procedures to arrive at the desired result, i.e. the procurement of necessary ancillary services for uninsured, disabled individuals during the pendency of an SSDI claim are intended to be included within the scope of the invention. Furthermore, various modifications and changes can be made in the foregoing detailed description without departing from the scope of the invention. Therefore, the description and accompanying exhibits are intended to be illustrative only and should not be construed in a limiting sense.

The invention claimed is:

1. A method of obtaining Social Security disability insurance benefits (SSDI) from the Social Security Administration (SSA) for a disabled individual and providing medical services or medical products during the pendency of the claim for SSDI, comprising:
   filing a claim for SSDI with the SSA for the disabled individual;
   obtaining from the disabled individual authorization for direct recovery of a predetermined amount of funds from a deposit account;
   obtaining medical services or medical products for the disabled individual from a healthcare provider, without full payment for medical services or medical products;
   obtaining the SSDI for the disabled individual as a result of the filing of the claim with the SSA, said SSDI being deposited in the deposit account;
   recovering from the deposit account by a computer a preauthorized, predetermined amount of funds following the deposit of the SSDI by SSA, said amount of funds being an amount needed to compensate the healthcare provider for the medical services or medical products obtained for the disabled individual without full payment; and
   transferring the recovered funds to the healthcare provider.

2. The method of claim 1 wherein the following steps are performed in the recited order:
   filing a claim for SSDI with the SSA for the disabled individual;
   obtaining from the disabled individual preauthorization for direct recovery of a predetermined amount of funds from a deposit account;
   obtaining medical services or medical products for the disabled individual from a healthcare provider, without full payment for medical services or medical products; and
   obtaining the SSDI for the disabled individual as a result of the filing of the claim with the SSA, said SSDI being deposited in the deposit account.

3. The method of claim 1 wherein the step of transferring the recovered funds to the healthcare provider further comprises electronically transferring the recovered funds.

4. The method of claim 1 wherein the step of recovering from the deposit account a preauthorized, predetermined amount of funds from the account after the award of SSDI is deposited by SSA further comprises recovering service fees from the deposit account.

5. A method of providing payment to a healthcare provider for ancillary services provided to a claimant before an award of a SSDI benefit, comprising,
   obtaining authorization from the claimant for electronic capture of a predetermined amount of payment for the ancillary services before the receipt of a SSDI benefit and then capturing by a computer from a deposit account the payment for the ancillary services, wherein the electronic capture is completed after the SSDI benefit is directly deposited in a deposit account but before the SSDI benefit is removed from the deposit account by the claimant.

6. The method of claim 5 wherein the ancillary services comprise medical services.

7. The method of claim 5 wherein the ancillary services comprise medical products.

8. The method of claim 6 wherein the medical services are selected from a group of medical services consisting of physician services, physical therapy, rehabilitation services, return to work service, occupational therapy, dietetic counseling, audiology, home nursing, home intravenous therapy, dental care and payment of health insurance premiums.

9. The method of claim 7 wherein the medical products are selected from a group of medical products consisting of walkers, canes, feeding pumps, wheelchairs, therapeutic cushions, hospital beds, lift chairs, eye glasses, hearing aids, prosthetic limbs, prescription drugs, non-prescription drugs, intravenous fluids, oral nutritional supplements, bandages, and bed pads.

10. A data processing system for managing a service for providing ancillary services provided to an SSDI claimant before the receipt of SSDI, comprising:
    a computer processor for processing data; and
    computer software configured to perform data processing functions comprising:
    a). filing a claim for SSDI on behalf of a claimant;
    b). confirming that SSDI was awarded to the claimant by the SSA;
    c). determining a date of deposit of the SSDI in a deposit account;
    d). accessing the deposit account;
    e). recovering from the claimant deposit account an amount needed of money after the SSDI benefit is deposited by the SSA in the claimant deposit account to pay for ancillary services provided to the claimant by a third party provider before the deposit of the SSDI; and
    f). transferring the recovered amount to the third party provider.

11. The system of claim 10 further comprising providing financial assistance to the claimant prior to receipt of SSDI.

12. A method of obtaining a SSDI benefit for a claimant and providing payment for ancillary services provided to the claimant by a healthcare provider prior to the receipt of a SSDI benefit by the claimant, comprising:
    determining if the claimant qualifies for SSDI from the SSA;
    filing a claim for the claimant with the SSA to qualify for SSDI;
    obtaining authorization from the claimant to recover a predetermined amount of money from a deposit account;
    establishing direct deposit of a SSDI benefit in a deposit account on behalf of the claimant for the direct deposit of the SSDI benefit by the SSA into the deposit account;
    obtaining an approximate date of the direct deposit of the SSDI benefit from the SSA to the deposit account;
    determining an amount of the SSDI benefit to which the claimant is entitled;
    determining an amount of money to be removed from the deposit account and transferred to the healthcare provider as payment for ancillary services provided to the claimant by the healthcare provider prior to receipt of the SSDI benefit by the claimant;
    accessing the deposit account held by the claimant;
    automatically recovering from the deposit account by a computer the amount of money to be transferred to the healthcare provider as payment for the ancillary services after the direct deposit of the SSDI benefit; and
    transferring the recovered amount of money to the healthcare provider.

13. The method of claim 12 wherein the step of obtaining from the disabled individual preauthorization for electronic recovery of a predetermined amount of money from a deposit account occurs after the step of obtaining an award of SSDI benefit but before the step of recovering the amount of money from the deposit account.

14. The method of claim 12 wherein the step of filing a claim for the claimant with the SSA to qualify for SSDI occurs before the step of obtaining authorization from the claimant to recover a predetermined amount of money from a deposit account.

15. The method of claim 12 wherein the ancillary services comprise medical services.

16. The method of claim 12 wherein the ancillary services comprise medical products.

17. The method of claim 15 wherein the medical services are selected from a group of professional medical services consisting of physician services, physical therapy, rehabilitation services, return to work service, occupational therapy, dietetic counseling, audiology, home nursing, home intravenous therapy, dental care and payment of health insurance premiums.

18. The method of claim 16 wherein the medical products are selected from a group of medical products consisting of walkers, canes, feeding pumps, wheelchairs, therapeutic cushions, hospital beds, lift chairs, eye glasses, hearing aids, prosthetic limbs, prescription drugs, non-prescription drugs, intravenous fluids, oral nutritional supplements, bandages, and bed pads.

19. The method of claim 12 further comprising the step of verifying an amount of the deposit of a SSDI benefit in the deposit account by the SSA before the step of accessing the deposit account held by the claimant.

20. A method of obtaining SSDI for a claimant and recovering payment for ancillary services previously provided to the claimant by a third party provider, comprising:
    screening the claimant to determine if the claimant qualifies for SSDI from the SSA;
    filing a claim on behalf of the claimant with the SSA to qualify for SSDI;
    determining if the claimant requires ancillary services from a third party;
    referring the claimant's need for ancillary services to the third party provider;
    obtaining an authorization from the claimant for an electronic recovery of a predetermined amount of money required for payment for the ancillary services from a deposit account;
    obtaining the needed ancillary services for the claimant from the third party;
    obtaining direct payment of SSDI from the SSA to the deposit account;
    accessing the deposit account;
    recovering from the deposit account by a computer the predetermined amount of money required to pay the third party provider for the ancillary services; and
    transferring the above-recited amount to the third party provider.

21. The method of claim 20 further comprising electronically recovering service fees from the deposit account.

22. The method of claim 20 further comprising providing financial assistance services to the claimant before the step of obtaining direct payment of SSDI from the SSA to the deposit account.

23. The method of claim 20 further comprising an initial step of obtaining a referral of a claimant from the third party provider.

24. The method of claim 20 further comprising a step of obtaining the predetermined amount of money required to pay the third party provider for the ancillary services from the third party provider.

25. A method of obtaining Social Security disability insurance benefits (SSDI) from the Social Security Administration (SSA) for a disabled individual and recovering payment for ancillary services that were provided to the disabled individual by a healthcare provider before an award of SSDI, comprising:

filing a claim with the SSA for SSDI on behalf of the disabled individual by a service provider;
determining a predetermined amount of money required to pay for the ancillary services and service fees;
obtaining from the disabled individual an authorization for direct recovery of a predetermined amount of money from a deposit account to pay for ancillary services and service fees;
establishing direct deposit of SSDI in the deposit account;
obtaining ancillary services for the disabled individual from a healthcare provider;
obtaining SSDI for the disabled individual as a result of the filing of the claim with the SSA, said SSDI being directly deposited in the deposit account;
electronically recovering from the deposit account the predetermined amount of money required to pay for the ancillary services and service fees after the deposit of the SSDI award by a computer;
retaining the service fees; and
transferring the amount required to pay for the ancillary services to the healthcare provider.

26. The method of claim 25 wherein the step of obtaining from the disabled individual an authorization for direct recovery of a predetermined amount of money to pay for ancillary services and service fees is performed by telephone.

27. The method of claim 25 wherein the step of obtaining from the disabled individual an authorization for direct recovery of a predetermined amount of money to pay for ancillary medical services and services fees is performed by computer.

28. The method of claim 25 wherein the step of obtaining from the disabled individual an authorization for direct recovery of a predetermined amount of money to pay for ancillary medical services and services fees is performed using a written form.

29. The method of claim 25 wherein the ancillary services further comprise medical services.

30. The method of claim 25 wherein the ancillary services further comprises medical products.

31. The method of claim 25 wherein the ancillary services further comprises financial assistance for the procurement of medical services or products.

32. The method of claim 25 wherein the financial assistance further comprises the payment of health insurance premiums on behalf of the disabled individual.

33. The method of claim 25 wherein the step of determining a predetermined amount of money required to pay for the ancillary services and service fees is performed by the healthcare provider.

34. The method of claim 25 wherein the step of recovering from the deposit account the predetermined amount of money required to pay for the ancillary services and service fees is performed on a periodic basis.

* * * * *